United States Patent
Otto

(10) Patent No.: US 11,915,472 B2
(45) Date of Patent: *Feb. 27, 2024

(54) ADAPTING PRE-TRAINED CLASSIFICATION ALGORITHMS

(71) Applicant: NOBLIS, INC., Reston, VA (US)

(72) Inventor: Charles Otto, Reston, VA (US)

(73) Assignee: NOBLIS, INC., Reston, VA (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/667,939

(22) Filed: Feb. 9, 2022

(65) Prior Publication Data

US 2022/0164610 A1    May 26, 2022

Related U.S. Application Data

(63) Continuation of application No. 16/831,395, filed on Mar. 26, 2020, now Pat. No. 11,275,973.

(60) Provisional application No. 62/834,118, filed on Apr. 15, 2019.

(51) Int. Cl.
| | |
|---|---|
| G06V 10/82 | (2022.01) |
| G06F 18/24 | (2023.01) |
| G06V 10/764 | (2022.01) |
| G06V 20/13 | (2022.01) |
| G06V 20/17 | (2022.01) |

(52) U.S. Cl.
CPC .............. *G06V 10/82* (2022.01); *G06F 18/24* (2023.01); *G06V 10/764* (2022.01); *G06V 20/13* (2022.01); *G06V 20/17* (2022.01)

(58) Field of Classification Search
CPC .................... G06K 9/0063; G06K 9/6267
See application file for complete search history.

(56) References Cited

U.S. PATENT DOCUMENTS

| | | |
|---|---|---|
| 2017/0039454 A1 | 2/2017 | Sudo et al. |
| 2018/0253980 A1 | 9/2018 | Mohamadi |
| 2018/0293711 A1 | 10/2018 | Vogels et al. |
| 2019/0355113 A1 | 11/2019 | Wirch et al. |
| 2020/0193589 A1 | 6/2020 | Peshlov et al. |
| 2020/0302225 A1 | 9/2020 | Dutta et al. |
| 2020/0320354 A1 | 10/2020 | Ghesu et al. |

OTHER PUBLICATIONS

Ioffe et al. "Batch Normalization: Accelerating Deep Network Training by Reducing Internal Covariate Shift," International Conference on Machine Learning, Lille, France, Jul. 6-11, 2015; 11 pages.

(Continued)

*Primary Examiner* — David Bilodeau
(74) *Attorney, Agent, or Firm* — Morrison & Foerster LLP

(57) ABSTRACT

The present disclosure is directed to data classification. An exemplary computer-enabled method for classifying image data comprises: receiving an input image, wherein the input image is of a second data domain; providing the input image to a preprocessing algorithm to obtain a transformed image, wherein the preprocessing algorithm is trained to transform data of the second data domain to data of a first data domain; providing the transformed image to a trained algorithm to analyze the transformed image, wherein the trained algorithm is trained based on training data of the first data domain.

20 Claims, 13 Drawing Sheets
(5 of 13 Drawing Sheet(s) Filed in Color)

(56) References Cited

OTHER PUBLICATIONS

Mao et al. "Least Squares Generative Adversarial Networks," IEEE International Conference on Computer Vision, Venice, Italy, Oct. 22-29, 2017; 16 pages.
Otto, U.S. Notice of Allowance dated Oct. 21, 2021, directed to U.S. Appl. No. 16/831,395; 9 pages.
Ronneberger et al. "U-Net: Convolutional Networks for Biomedical Image Segmentation," International Conference on Medical Image Computing and Computer-Assisted Intervention, Munich, Germany, Oct. 5-9, 2015, 8 pages.
Ulyanov et al. (2016). "Instance Normalization: The Missing Ingredient for Fast Stylization," CoRR, vol. abs/1607.0802; arXiv:1607.08022; 6 pages.
Zhu et al. "Unpaired Image-to-Image Translation using Cycle-Consistent Adversarial Networks," IEEE International Conference on Computer Vision, Venice, Italy, Oct. 22-29, 2017, 18 pages.

Tensor with 2 spatial dimensions x, y and some number of channels c.

Receiving a input image patch, wherein the input image patch is of a second data domain
702

Providing the input image patch to a preprocessing algorithm to obtain a preprocessed image patch, wherein the preprocessing algorithm is trained to transform data of the second data domain to data of a first data domain
704

Providing the preprocessed image patch to a pre-trained classification algorithm, wherein the pre-trained classification algorithm is trained based on training data of the first data domain
706

Obtaining one or more classification outputs from the pre-trained classification algorithm based on the preprocessed image patch
708

FIG. 7

ADAPTING PRE-TRAINED CLASSIFICATION ALGORITHMS

CROSS-REFERENCE TO RELATED APPLICATIONS

This application is a continuation of U.S. application Ser. No. 16/831,395, filed on Mar. 26, 2020, which claims the benefit of U.S. Provisional Application No. 62/834,118, filed on Apr. 15, 2019, the entire contents of each of which are incorporated herein by reference and for all purposes.

FIELD

The present disclosure relates generally to data classification, and more specifically to systems, methods, and devices for adapting or augmenting pre-trained classification algorithms to produce better classification results on a given type of data (e.g., low-resolution image data).

BACKGROUND

Pre-trained classification algorithms (e.g., pre-trained neural networks) often produce poor classification results when presented with input data that differs from the training data in important aspects, such as quality, resolution, size, and/or hardware and software used to capture or generate the data. For example, if a classification algorithm has been trained with high-quality images (e.g., an ImageNet dataset), it may produce poor classification results when attempting to classify low-quality images, for example, images or video frames captured by an unmanned aerial vehicle ("UAV") or a glider, which are generally configured to capture lower-resolution image data.

Adapting a pre-trained classification algorithm to better classify a particular type of data can be challenging. For example, adapting a classification algorithm that has been trained with an ImageNet dataset to better classify UAV/glider image data, given a set of UAV/glider image data as exemplary data to be classified, can be difficult. Specifically, the set of exemplary UAV/glider image data, while containing known image quality problems, is not accompanied with a corresponding image data that do not contain image quality problems. That is, there is no known "good" version of the UAV/glider image data for an algorithm to be trained to identify and/or remove the image quality problems.

Thus, there needs to be a system and method for adapting or augmenting a pre-trained classification algorithm to better classify a given type of data (e.g., low-quality data). For example, the desired system can adapt or augment the pre-trained classification algorithm to better classify low-quality data given a set of training data that is low-quality (e.g., a set of low-resolution images), without also requiring a set of training data representing the good version of the low-quality data (e.g., higher-resolution versions of the same images).

SUMMARY

An exemplary computer-enabled method for classifying image data comprises: receiving an input image patch, wherein the input image patch is of a second data domain; providing the input image patch to a preprocessing algorithm to obtain a preprocessed image patch, wherein the preprocessing algorithm is trained to transform data of the second data domain to data of a first data domain; providing the preprocessed image patch to a pre-trained classification algorithm, wherein the pre-trained classification algorithm is trained based on training data of the first data domain; obtaining one or more classification outputs from the pre-trained classification algorithm based on the preprocessed image patch.

In some embodiments, data of the first data domain is associated with a first image style, data of the second data domain is associated with a second image style, and the preprocessing algorithm is trained to transform a first image of the first image style to a second image of the second image style while preserving content of the first image in the second image.

In some embodiments, data of the first data domain is associated with a first image resolution range, and data of the second data domain is associated with a second image resolution range.

In some embodiments, the method further comprises training the preprocessing algorithm, wherein training the preprocessing algorithm comprises: receiving a first set of training data of the first data domain; receiving a second set of training data of the second data domain; training a first image generator, based on the first set of training data and the second set of training data, to transform a given image of the first data domain to an image of the second data domain; training a second image generator, based on the first set of training data and the second set of training data, to transform a given image of the second data domain to an image of the first data domain, wherein the preprocessing algorithm comprises the second image generator.

In some embodiments, the first image generator comprises a first convolution neural network, and the second image generator comprises a second convolution neural network.

In some embodiments, the method further comprises optimizing the second image generator by performing normalization across a plurality of channels in the second convolution neural network, wherein the plurality of channels represent outputs of a convolution layer, and wherein the plurality of channels correspond to a single pixel.

In some embodiments, the method further comprises providing an original image patch of the second set of training data to the second image generator to obtain a corresponding processed image patch; and calculating an adversarial loss based on the original image patch and the corresponding processed image patch.

In some embodiments, the method further comprises providing the corresponding processed image patch to the first image generator to obtain a corresponding cycled image patch; and calculating a cycle loss based on the original image patch and the corresponding cycled image patch.

In some embodiments, the original image patch is a portion of an image in the first second set of training data, wherein the portion is selected based on one or more annotations associated with the image.

In some embodiments, the one or more annotations represent one or more objects of interest.

In some embodiments, the first image generator is configured to receive an input image of a first size and output an output image of a second size, wherein the second size is smaller than the first size.

In some embodiments, the second image generator is configured to receive an input image of the second size and output an output image of the first size.

In some embodiments, the second convolution neural network comprises a skip connection associated with two layers of the neural network, wherein the two layers are associated with a same spatial resolution.

In some embodiments, training the second image generator comprises calculating an identity mapping value.

In some embodiments, the first image generator and the second image generator are part of a modified CycleGAN implementation.

In some embodiments, data of the second data domain is captured by one or more unmanned aircraft vehicles.

In some embodiments, data of the first data domain is associated with the ImageNet database.

In some embodiments, the input image patch is a first input image patch, wherein the preprocessed image patch is a first preprocessed image patch, and wherein the preprocessing algorithm is a first preprocessing algorithm, further comprising: receiving a second input image patch, wherein the second input image patch is of a third data domain; providing the second input image patch to a second preprocessing algorithm to obtain a second preprocessed image patch, wherein the second preprocessing algorithm is trained to transform data of the third data domain to data of the first data domain; providing the second preprocessed image patch to the pre-trained classification algorithm; and obtaining one or more classification outputs from the pre-trained classification algorithm based on the second preprocessed image patch.

An exemplary electronic device comprises: one or more processors; a memory; and one or more programs, wherein the one or more programs are stored in the memory and configured to be executed by the one or more processors, the one or more programs including instructions for: receiving a input image patch, wherein the input image patch is of a second data domain; providing the input image patch to a preprocessing algorithm to obtain a preprocessed image patch, wherein the preprocessing algorithm is trained to transform data of the second data domain to data of a first data domain; providing the preprocessed image patch to a pre-trained classification algorithm, wherein the pre-trained classification algorithm is trained based on training data of the first data domain; obtaining one or more classification outputs from the pre-trained classification algorithm based on the preprocessed image patch.

In some embodiments, a non-transitory computer-readable storage medium stores one or more programs, the one or more programs comprising instructions, which when executed by one or more processors of an electronic device having a display, cause the electronic device to: receive a input image patch, wherein the input image patch is of a second data domain; provide the input image patch to a preprocessing algorithm to obtain a preprocessed image patch, wherein the preprocessing algorithm is trained to transform data of the second data domain to data of a first data domain; provide the preprocessed image patch to a pre-trained classification algorithm, wherein the pre-trained classification algorithm is trained based on training data of the first data domain; obtain one or more classification outputs from the pre-trained classification algorithm based on the preprocessed image patch.

An exemplary computer-enabled method for pre-processing image data to improve performance of classification algorithms comprises: receiving data representing an input image, wherein the data representing the input image is of a second data domain; receiving data representing a pre-trained image classification algorithm, wherein the pre-trained image classification algorithm was trained based on a first data domain; generating, based on the data representing the input image and the preprocessing algorithm, preprocessed image data, wherein the preprocessing algorithm is configured to transform data of the second data domain to data of a first data domain.

In some embodiments, the method further comprises, before generating the preprocessed image data, training the preprocessing algorithm based on a first set of training data of the first data domain and a second set of training data of the second data domain.

In some embodiments, training the preprocessing algorithm comprises: training a first image generator, based on the first set of training data and the second set of training data, to transform a given image of the first data domain to an image of the second data domain; and training a second image generator, based on the first set of training data and the second set of training data, to transform a given image of the second data domain to an image of the first data domain.

In some embodiments, the generating the preprocessed image data is performed in response to receiving the data representing the input image and the data representing the pre-trained image classification algorithm.

In some embodiments, the data representing the pre-trained image classification algorithm comprises an indication comprises an indication that the pre-trained image classification algorithm was trained based on a first data domain.

An exemplary electronic device comprises one or more processors; a memory; and one or more programs, wherein the one or more programs are stored in the memory and configured to be executed by the one or more processors, the one or more programs including instructions for: receiving data representing an input image, wherein the data representing the input image is of a second data domain; receiving data representing a pre-trained image classification algorithm, wherein the pre-trained image classification algorithm was trained based on a first data domain; generating, based on the data representing the input image and the preprocessing algorithm, preprocessed image data, wherein the preprocessing algorithm is configured to transform data of the second data domain to data of a first data domain.

An exemplary non-transitory computer-readable storage medium stores one or more programs, the one or more programs comprising instructions, which when executed by one or more processors of an electronic device having a display, cause the electronic device to: receive data representing an input image, wherein the data representing the input image is of a second data domain; receive data representing a pre-trained image classification algorithm, wherein the pre-trained image classification algorithm was trained based on a first data domain; generate, based on the data representing the input image and the preprocessing algorithm, preprocessed image data, wherein the preprocessing algorithm is configured to transform data of the second data domain to data of a first data domain.

BRIEF DESCRIPTION OF THE FIGURES

The patent or application file contains at least one drawing executed in color. Copies of this patent or patent application publication with color drawings will be provided by the office upon request and payment of the necessary fee.

FIG. 7 depicts a block diagram of an exemplary process for training the preprocessing algorithm, in accordance with some embodiments.

DETAILED DESCRIPTION

Described herein are systems and methods for adapting or augmenting a pre-trained classification algorithm to better classify a given type of data (e.g., low-quality image data). For example, the desired system can adapt the pre-trained classification algorithm to better classify low-quality data given a set of training data representing the low-quality data, without also requiring a set of training data representing the good version of the low-quality data.

An exemplary method includes training a preprocessing algorithm based on the set of training data representing the given type of data to be classified (a set of training data captured by a UAV or a glider). After training, the preprocessing algorithm can take any data of the given type (e.g., any image data captured by the UAV or the glider) and process them so that, when the processed data is inputted into a pre-trained classification algorithm (e.g., an object classification network pre-trained on ImageNet data), the pre-trained classification algorithm can produce better classification results based on the processed data. In some embodiments, the processed data outputted by the preprocessing algorithm are not only easier to be classified by classification algorithms, but are also easier for human recognition.

In some embodiments, the pre-trained classification algorithm has been trained using data of a first data domain, such as image data from the ImageNet database. In contrast, the input data to be classified are of a second data domain, such as lower-resolution image data captured by a drone or a glider. In some embodiments, the preprocessing algorithm is a style-transfer algorithm that is trained to process data of the second data domain such that the content is preserved but the style matches data of the first data domain. In some embodiments, the preprocessing algorithm is a modified version of a CycleGAN generator.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
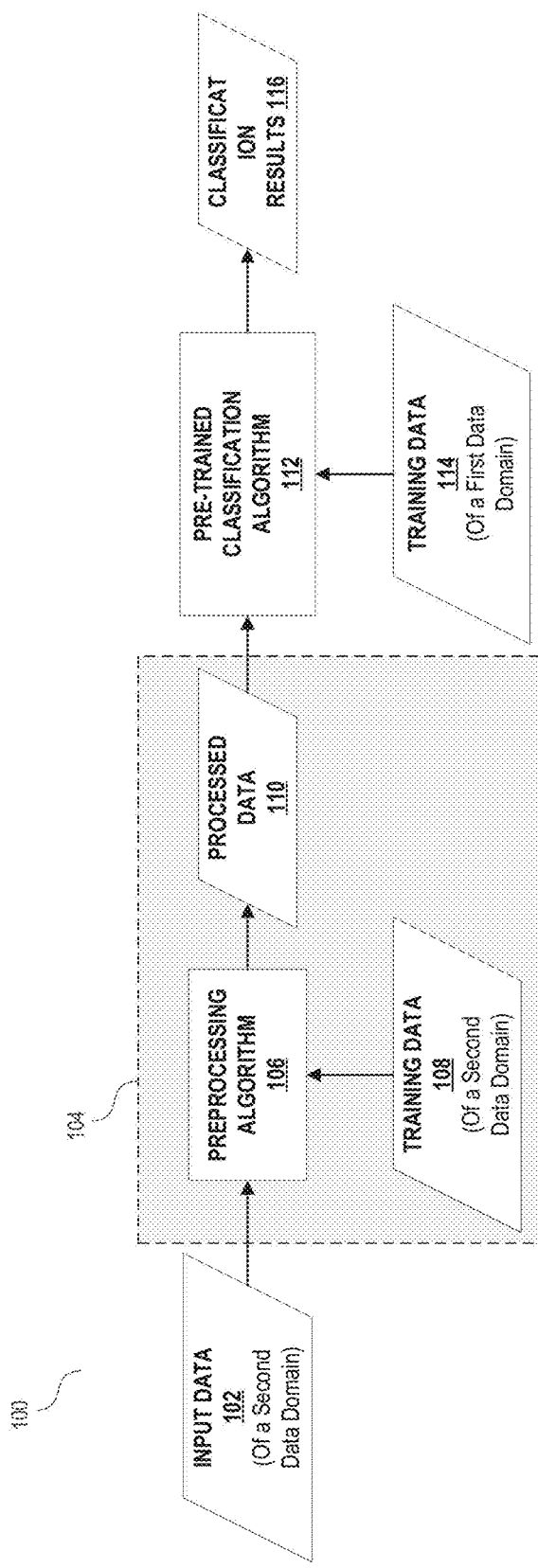
FIG. 1 depicts an exemplary process for obtaining enhanced classification results using a preprocessing algorithm, in accordance with some embodiments

FIG. 1 illustrates an exemplary process 100 for obtaining enhanced classification results using a preprocessing algorithm, in accordance with some embodiments. With reference to FIG. 1, a pre-trained classification algorithm 112 has been trained based on training data 114. The pre-trained classification algorithm 112 can include one or more neural networks, one or more support vector machines, or any suitable algorithms or models or combinations thereof. Having been trained by the training data 114, the pre-trained classification algorithm 112 is configured to receive input image data, identify objects of one or more classes (e.g., geographic features such as rivers and mountains, traffic features such as lane marks, intersections, and traffic signs, moving objects such as cars, pedestrians, and cyclists) in the input image data, and provide classification results 116.

The training data 114 is of a first data domain. In some embodiments, the first data domain refers to high-quality image data, for example, image data having a resolution higher than a predefined threshold. In some embodiments, the first data domain refers to data from one or more data sources (e.g., ImageNet). In some embodiments, the first data domain refers to data sharing the same artistic style.

In the depicted example, the input data 102 is of a second data domain different from the first data domain. In some embodiments, the second data domain refers to low-quality image data, for example, image data having a resolution lower than a predefined threshold. In some embodiments, the second data domain refers to data from one or more data sources (e.g., image data or video data captured by a UAV or a glider) different from the data sources of the first data domain. In some embodiments, the second data domain refers to data sharing a different artistic style. Thus, the input data 102 and the training data 114 differ in important aspects. As discussed above, because the pre-trained classification algorithm 112 has been trained using the training data 114 of the first data domain, the pre-trained classification algorithm 112 can produce poor classification results if the input data 102 of the second data domain is directly inputted into the algorithm 112.

To achieve better classification results from the pre-trained classification algorithm 114, the system 100 include a preprocessing operation 104 to process the input data 102 such that the input data 102 can be easier to classify for the pre-trained classification algorithm 112. With reference to FIG. 1, a preprocessing algorithm 106 has been trained by training data 108 of the second data domain. In some embodiments, the preprocessing algorithm has also been trained by training data of the first data domain. In an exemplary scenario where the first data domain refers to high-quality data from the ImageNet and the second data domain refers to low-quality data captured by a UAV or a glider, the training data 108 can include a set of image data captured by the UAV or the glider and can optionally include one or more annotations (e.g., geographic features such as rivers and mountains, traffic features such as lane marks, intersections, and traffic signs, moving objects such as cars, pedestrians, and cyclists) associated with the image data. In some embodiments, the preprocessing algorithm is a style-transfer algorithm that is trained to transform input data of the second data domain to the style of the first data domain, while preserving the content of the input data, as described in detail below.

Figure 2B:
FIG. 2B depicts an exemplary result of the preprocessing algorithm, in accordance with some embodiments.
Figure 2A:
FIG. 2A depicts an exemplary input of the preprocessing algorithm, in accordance with some embodiments.
Figure 3A:
FIG. 3A depicts an exemplary input of the preprocessing algorithm, in accordance with some embodiments.
Figure 3B:
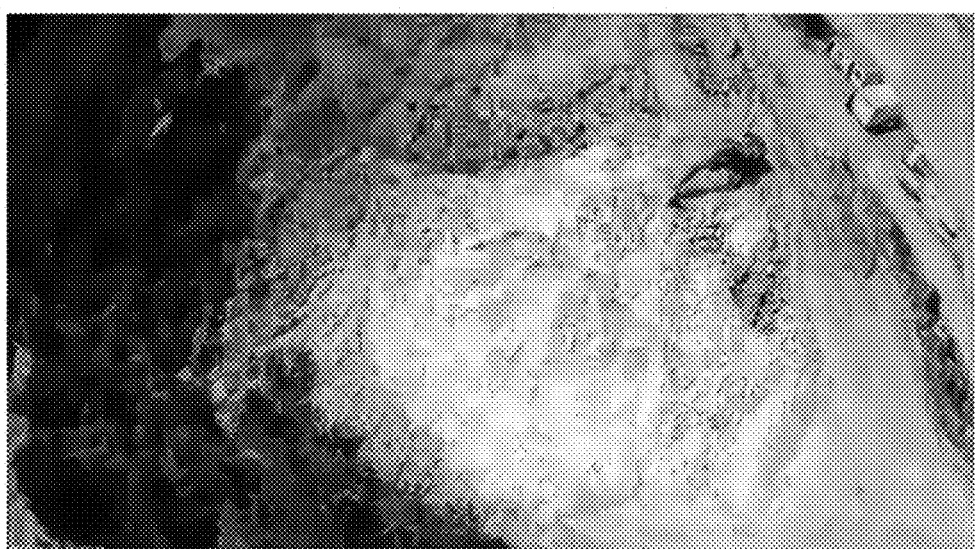
FIG. 3B depicts an exemplary result of the preprocessing algorithm, in accordance with some embodiments.

In operation, the preprocessing algorithm 106 can receive the input data 102 and outputs processed data 110, which is in turn inputted into the pre-trained classification algorithm 112. FIGS. 2A-B and 3A-B depict exemplary inputs and outputs of the preprocessing algorithm 106, in accordance with some embodiments. Specifically, FIG. 2B depicts the output image of the preprocessing classification algorithm based on the input image in FIG. 2A. As shown, compression artifacts are reduced, that is, the block artifacting in the original image is barely visible; further, some details are filled in. In FIG. 3B, block artifacting in the original image in FIG. 3A is also reduced and the saturation of the image is noticeably increased. In some embodiments (not depicted), the output images of the preprocessing algorithm are of a larger size than the input images.

Figure 4A:
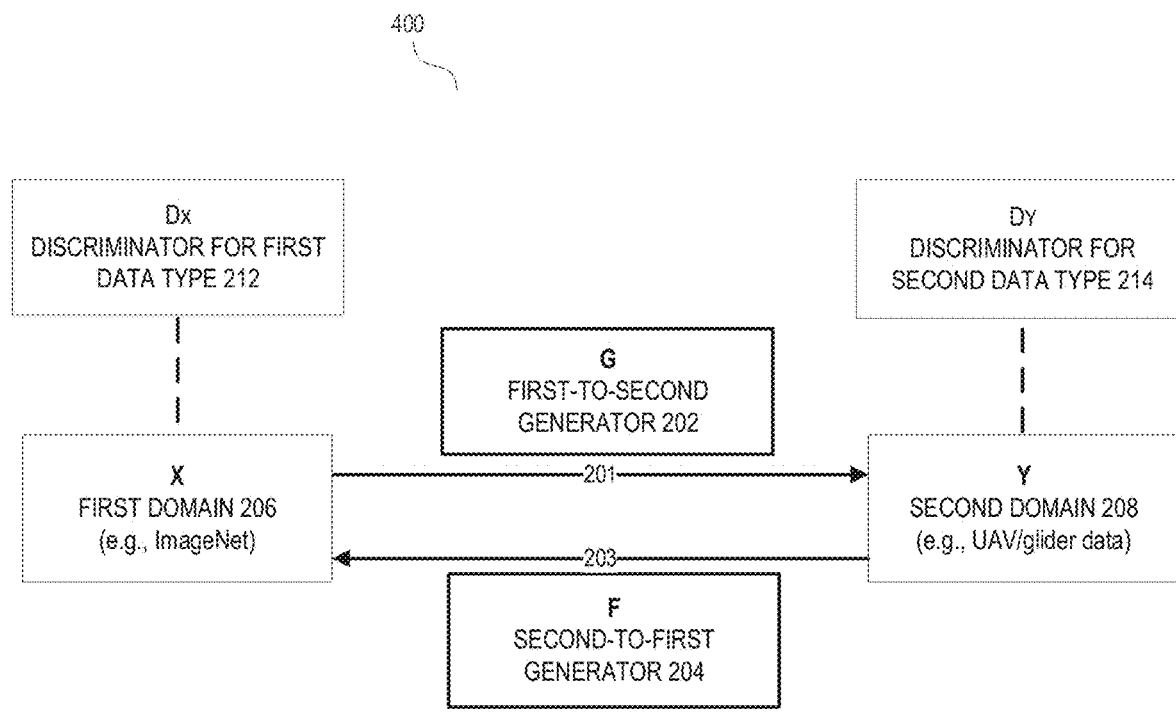
FIG. 4A depicts an exemplary diagram for training an exemplary pre-processing algorithm, in accordance with some embodiments.

FIG. 4A depicts an exemplary diagram for training an exemplary pre-processing algorithm, in accordance with some embodiments. Model 400 is configured to learn a transformation between two domains 206 and 208 when no exact correspondence between samples of the two domains is available. In the depicted example, model 400 comprises a generator 202 trained to transform data of a first data domain to data of a second data domain, and a generator 204 trained to transform data of the second data domain to data of the first data domain. In other words, G (i.e., generator 202) is a mapping function wherein G: X→Y and F (i.e., generator 204) is a mapping function wherein F: Y→X.

The first data domain and the second data domain refer to two sets of data that differ from each other in certain aspects, for example, resolution, size, style, etc. For example, the first data domain can be high-quality image data from the ImageNet, while the second data domain can be low-quality image data captured by a UAV or a glider. As such, the generator 204 of the model 400 is trained to transform an original image captured by a UAV or a glider to an image having the ImageNet style while preserving the content of the original image (as indicated by arrow 201), while the generator 202 of the model 400 is trained to transform an original ImageNet image to an image having the style of UAV/glider images while preserving the content of the original image (as indicated by arrow 204). Thus, the trained generator 204 can be the preprocessing algorithm 106 (FIG. 1).

With reference to FIG. 4A, the model 400 further comprises adversarial discriminators 212 and 214. The generator 202 is configured to translate an image in the first domain into outputs, which are fed into the discriminator 214 to determine whether the outputs represent a "real" or "fake" image of the second domain 208 and to train the generator 202 accordingly. Similarly, the generator 204 is configured to translate an image in the second domain into outputs, which are fed into the discriminator 212 to determine whether the outputs represent a "real" or "fake" image of the first domain 206 and to further the generator 204 accordingly.

The objective of the model contains two types of terms: adversarial losses for matching the distribution of generated images to the data distribution in the target domain; and cycle consistency losses to prevent the learned mappings G and F from contradicting each other. In an exemplary model comprising an ImageNet domain and a UAV/glider domain, adversarial losses are used to make sure that the results of transformation from ImageNet→UAV look like UAV images, and the transformation from UAV→ImageNet looks like ImageNet images. Further, cycle losses are used to make sure that the transformations still retain the original image content (i.e. UAV→ImageNet→UAV still looks like the original UAV image, and ImageNet→UAV→ImageNet looks like the original ImageNet image).

In some embodiments, the model 400 is implemented as a variation of CycleGAN. For the mapping function G: X→Y and its discriminator 214 ($D_Y$), the objective is expressed as:

$$\mathcal{L}_{GAN}(G, D_Y, X, Y) = \mathbb{E}_{x \sim p_{data}(y)}[\log D_Y(y)] + \mathbb{E}_{y \sim p_{data}(x)}[\log(1 - D_Y(G(x)))]$$

where G tries to generate images G(x) that look similar to images from domain Y, while $D_Y$ aims to distinguish between translated samples G(x) and real samples y. G aims to minimize this objective against an adversary D that tries to maximizes it, i.e., $\min_G \max_{D_Y} \mathcal{L}_{GAN}(G, D_Y, X, Y)$. A similar adversarial loss for the mapping function F: Y→X and its discriminator $D_X$ can be introduced as well: $\min_F \max_{D_X} \mathcal{L}_{GAN}(F, D_X, Y, X)$.

Figure 4B:
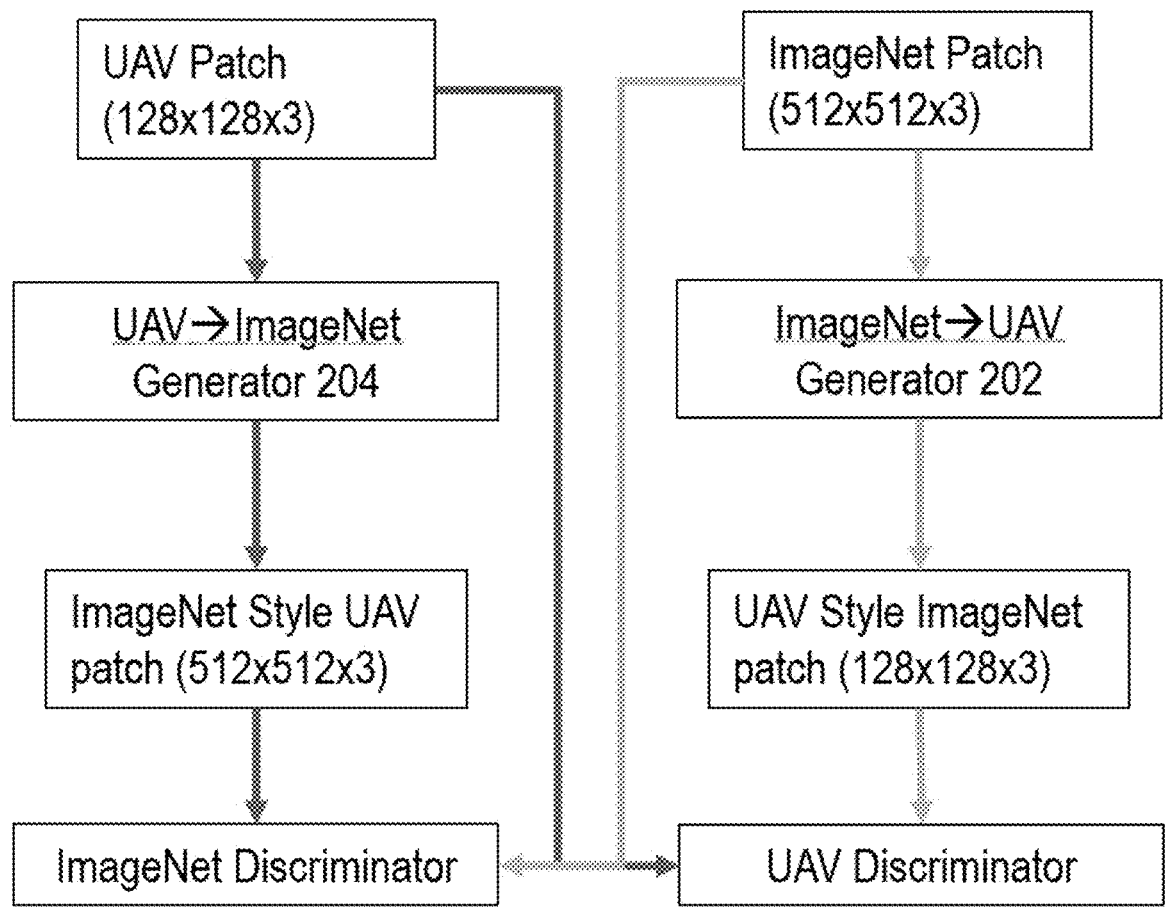
FIG. 4B depicts an exemplary flow diagram for calculating adversarial losses, in accordance with some embodiments.

FIG. 4B illustrates an exemplary flow diagram for calculating adversarial losses. In the exemplary implementation, a UAV patch (size 128×128, 3 channels) is processed by the generator 204 to produce an ImageNet style UAV patch (size 512×512, 3 channels). The ImageNet style UAV patch is inputted into the ImageNet discriminator, which aims to distinguish between the ImageNet style UAV patch (i.e., a "fake" ImageNet image) and a real ImageNet patch. Adversarial loss can be calculated based on the ImageNet style UAV patch and the original UAV patch. A similar process is performed at the generator 202 and the UAV discriminator.

Adversarial losses alone cannot guarantee that the learned function can map an individual input to a desired output. To further reduce the space of possible mapping functions, the learned mapping functions should be cycle-consistent: for each image from domain X, the image translation cycle should be able to bring x back to the original image, i.e., x→G(x)→F(G(x))≈x. Cycle consistency loss can be expressed as:

$$\mathcal{L}_{cyc}(G, F) = \mathbb{E}_{x \sim p_{data}(x)}[\|F(G(x)) - x\|_1] + \mathbb{E}_{y \sim p_{data}(y)}[\|G(F(y)) - y\|_1].$$

Figure 4C:
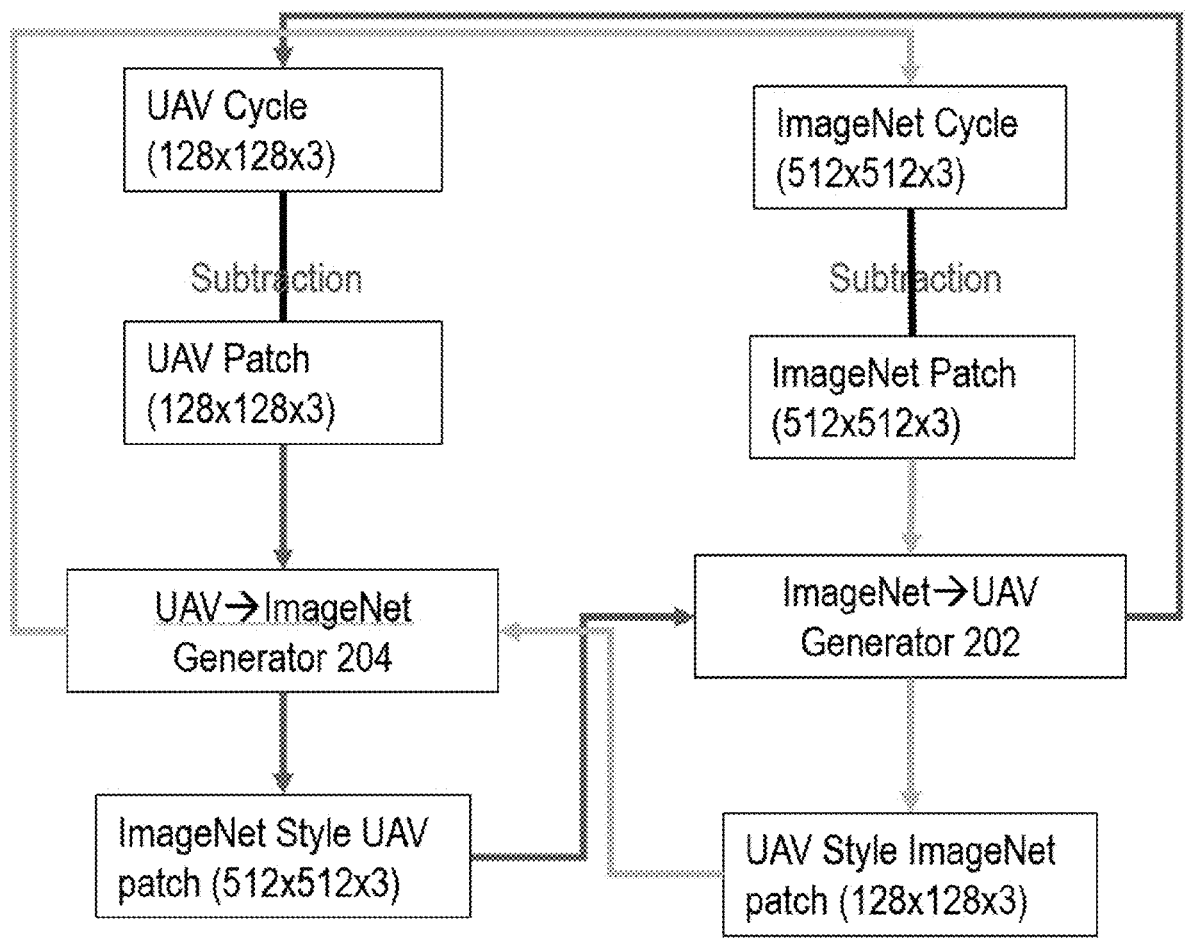
FIG. 4C depicts an exemplary flow diagram for calculating cycle losses, in accordance with some embodiments.

FIG. 4C illustrates an exemplary flow diagram for calculating cycle losses. In the exemplary implementation, a UAV patch is inputted into the generator 204 to produce an ImageNet style UAV patch. The ImageNet style UAV patch is then inputted into the generator 202 to produce a cycled image. The cycled image is compared against the original UAV patch to determine the cycle consistency loss. A similar process is performed by the generator 202.

Thus, the total objective is:

$$\mathcal{L}(G, F, D_X, D_Y) =$$

-continued $$\mathcal{L}_{GAN}(G, D_Y, X, Y) + \mathcal{L}_{GAN}(F, D_X, Y, X) + \lambda\mathcal{L}_{cyc}(G, F),$$

where λ controls the relative importance of the two objectives. The system is configured to solve:

$$G^*F^* = \underset{G,F}{\operatorname{argmin}}\underset{D_X, D_Y}{\max} \mathcal{L}(G, F, D_X, D_Y)$$

Figure 4D:
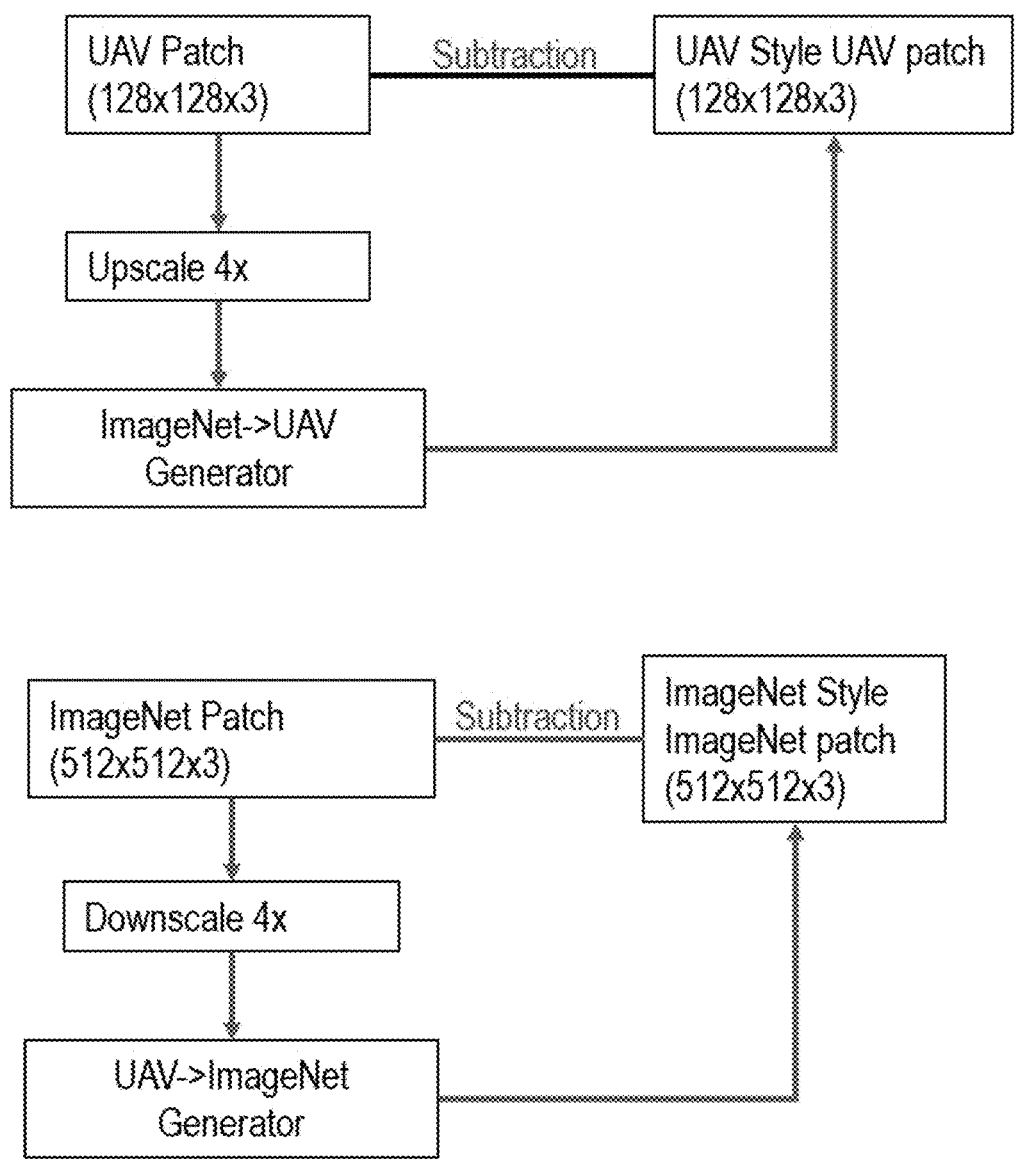
FIG. 4D depicts an exemplary flow diagram for calculating identity mapping losses, in accordance with some embodiments.

In some embodiments, training a generator with just the cycle-consistency and adversarial losses lead to mode failures such as both generators performing color inversion within a few thousand iterations. Adding the identity mapping losses (i.e. loss terms for G(X)–X, and F(Y)–Y) can be effective in avoiding these kinds of failures. FIG. 4D illustrates an exemplary flow diagram for calculating identity mapping losses.

More details on the design of CycleGAN can be found in "Unpaired Image-to-Image Translation using Cycle-Consistent Adversarial Networks" by Zhu et al., the content of which is incorporated by reference.

Figure 5A:
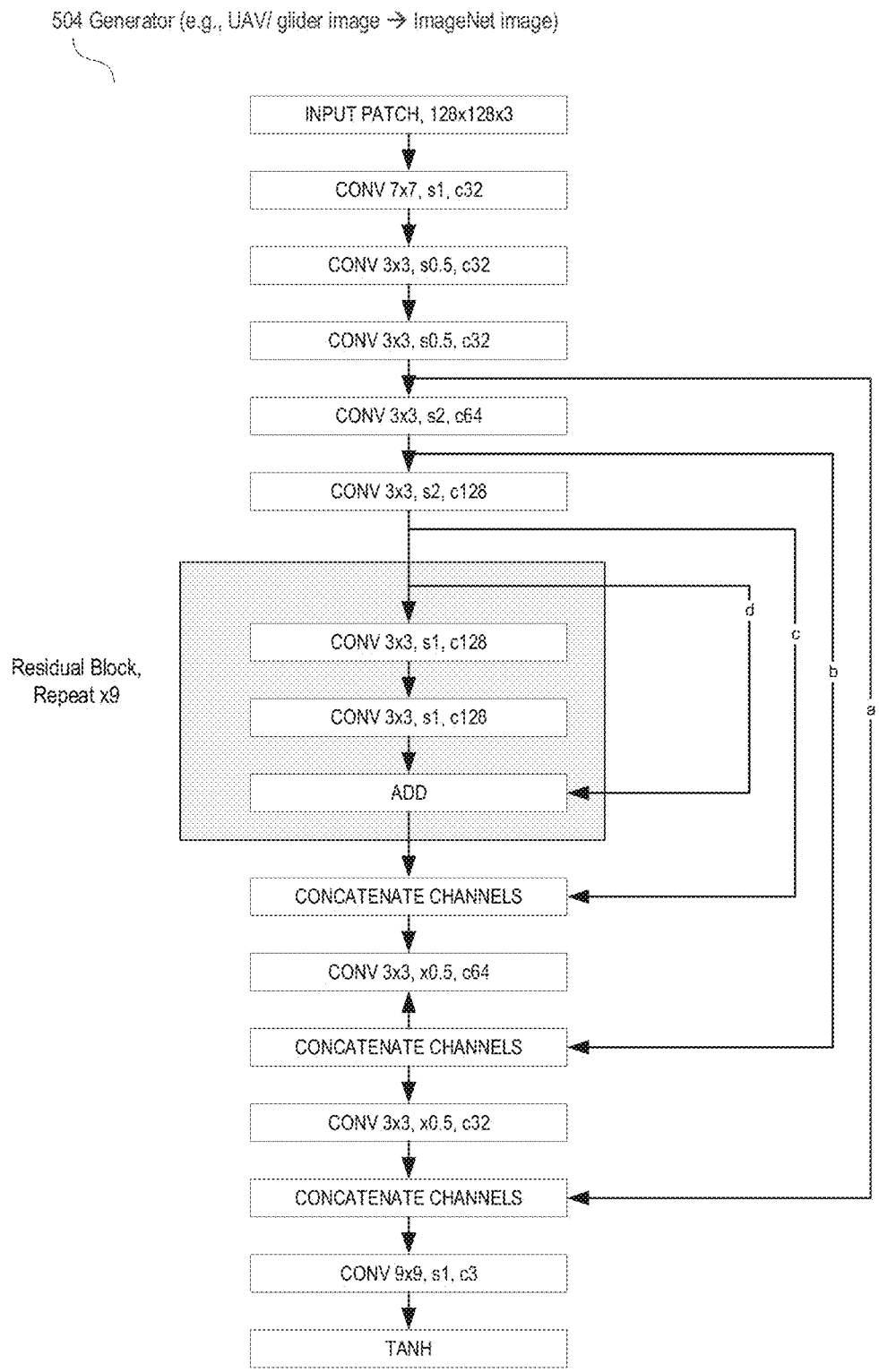
FIG. 5A depicts an exemplary generator of a modified CycleGAN implementation, in accordance with some embodiments.
Figure 5B:
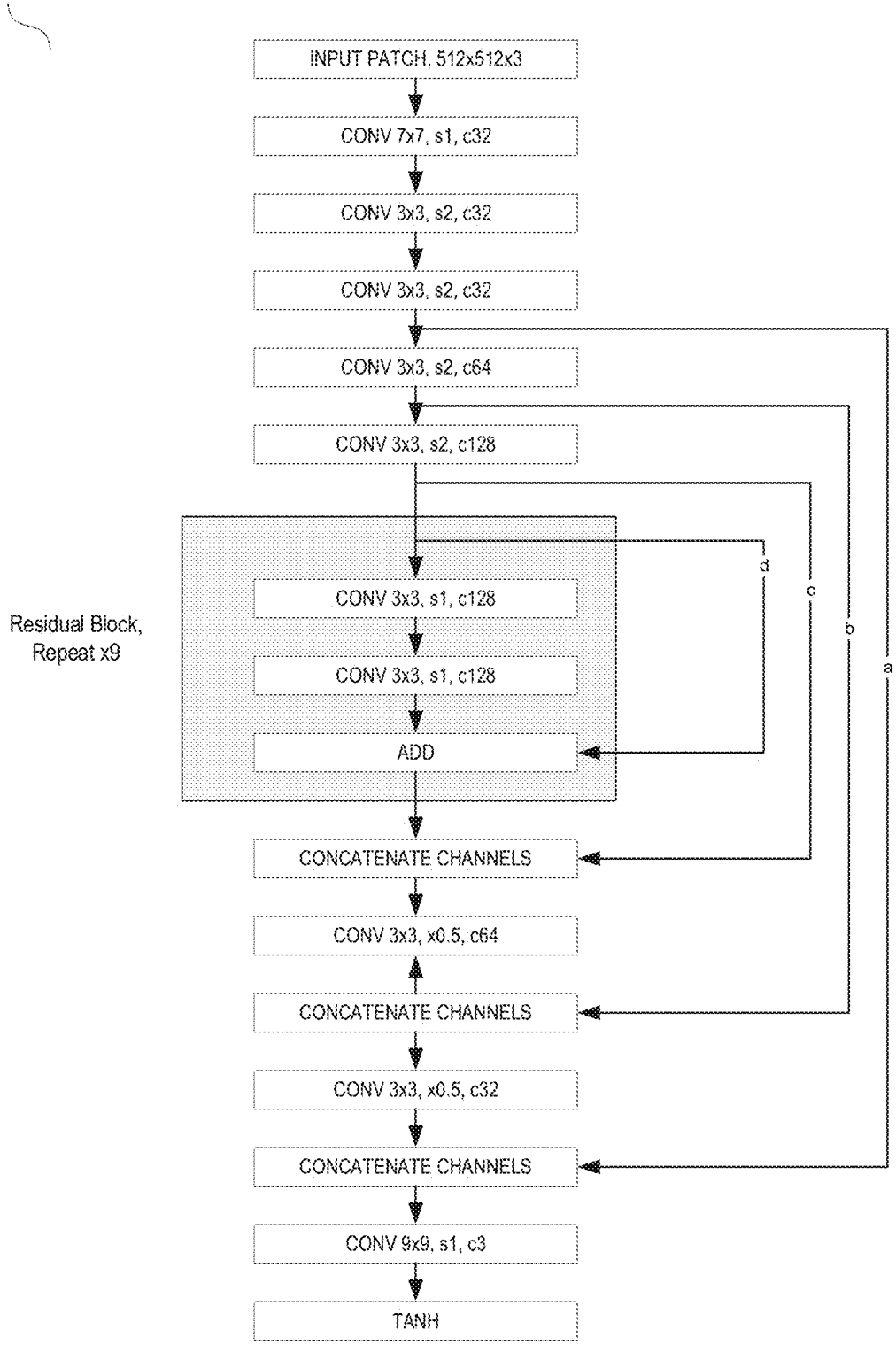
FIG. 5B depicts an exemplary generator of a modified CycleGAN implementation, in accordance with some embodiments.

FIGS. 5A and 5B illustrate exemplary generators 504 and 502, which can correspond to generators 204 and 202 of FIG. 4A, respectively. In particular, the generator 504 can also correspond to the preprocessing algorithm 106 (FIG. 1). For example, the generator 504 can be trained to transfer an image generated or captured by a UAV or a glider into an image in the ImageNet domain (i.e., an image having the ImageNet style). Further, the generator 502 can be trained to transfer an ImageNet image into an image in the UAV domain (i.e., an image having the style of UAV images).

Because the UAV images are typically substantially lower resolution than ImageNet images (in additional to other image quality problems), a resolution change is incorporated into the architecture of the generators 504 and 502. Specifically, the generator 504 (i.e., UAV→ImageNet transformation) is configured to produce 4× larger images (i.e., 4× upscaling), while the generator 502 (i.e., ImageNet→UAV transformation) is configured to produce 4× smaller images (i.e., 4× downscaling). With reference to FIG. 5A, the upscaling can be achieved by adding two 0.5 stride convolution layers after the first convolution layer. With reference to FIG. 5B, the downscaling can be achieved by adding two stride 2 convolution layers after the first convolution layer.

With reference to FIG. 5A, the generator 504 is trained using 128×128 patches selected from a set of UAV images. UAV patches can be selected by randomly sampling regions around the ground-truth annotation bounding boxes in the UAV images to avoid accidentally sampling flat-colored patches (e.g., sky) and other areas that do not contain enough objects of interest. As shown in FIG. 5B, the generator 502 is trained using ImageNet images cropped and resized to 512×512.

Each generator can be optimized using normalization techniques. In some embodiments, batch normalization techniques can be used. A BatchNorm layer can be used after every single convolution layer in the network. This can lead to faster convergence and improved stability (e.g. making it possible to train deeper networks without gradients dying) in typical classification applications, and is not significantly computationally costly. Specifically, the idea in BatchNorm is to approximate the parameters over the dataset by using the parameters for the batch during training (and also developing a fixed mean and standard deviation to use during inference). This works well if the samples in a batch are independent, and the batch is large enough. If a batch comprises an independent identically distributed sample of some source distribution/population, the convergence behavior of the sample mean to the true mean can be expressed using the central limit theorem. Additional descriptions of batch normalization techniques can be found in "Batch Normalization: Accelerating Deep Network Training by Reducing Internal Covariate Shift" by Ioffe et al., the content of which is incorporated by reference in its entirety.

In some embodiments when the batch size is small (e.g., batch size==1), instance normalization techniques can be used. Specifically, a mean and standard deviation over the pixels in a given channel are computed for a single input image/tensor, and this can be used as a replacement for BatchNorm. Thus, the process involves computing normalization parameters for each channel separately over the spatial region of the input image, which can improve convergence. In some embodiments, an instance normalization layer is used after every single convolution layer in the network. Additional descriptions of batch normalization techniques can be found in "Instance Normalization: The Missing Ingredient for Fast Stylization" by Ulyanov et al., the content of which is incorporated by reference in its entirety.

In some embodiments, a variation of instance normalization is used to implement the generator 504. Because the generator 504 is configured to enhance a large volume of data (e.g., full video frames captured by a UAV or a glider), the generator 504 must be implemented to either accommodate larger input or divide the input image into tiles. In either implementation, instance normalization can lead to poor results. Since instance normalization computes normalization values over a spatial region, those values shift if the generator's output is computed for different source regions. Thus, if an image is sub-divided into smaller regions and then passed through the generator and the system then stitches the outputs back together, there can be noticeable boundaries between blocks due to different local statistics. Further, when passing full frames through the generator, the output images can have a skewed color distribution due to a difference in statistics over different sized inputs.

Thus, instance normalization can be replaced with a "down channel" operation which performed normalization independently down the channels of each pixel. This stabilized convergence, and does not cause problems when tiling out large images.

Figure 6:
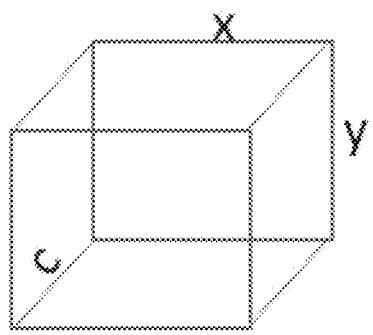
FIG. 6 depicts an exemplary tensor with 2 spatial dimensions x, y, and some numbers of channels c for a "down channel" normalization operation, in accordance with some embodiments.

FIG. 6 illustrates an exemplary tensor with 2 spatial dimensions x, y, and some numbers of channels c for a "down channel" normalization operation, in accordance with some embodiments. For example, a color 2D image has 2 spatial dimensions, and 3 channels (red, green, and blue channels). Intermediate outputs of a generator (e.g., a neural network) typically has 2 spatial dimensions as well (towards the end some architectures will completely discard the spatial dimensions), and some number of channels (often hundreds). Consider a tensor to be indexed as: $X_{ijk}$ where i and j are the spatial location, and k is the index of a channel, with total number of channels=c. Normalization is performed by computing (width, height) mean and standard deviation values as:

$$\mu_{ij} = \frac{\sum_{k=1}^{c} x_{ijk}}{c}$$

$$\sigma_{ij}^2 = \frac{\sum_{k=1}^{c}(x_{ijk}-\mu_{ij})^2}{c}$$

And standardizing:

$$y_{ijk} = \frac{x_{ijk}-\mu_{ij}}{\sqrt{\sigma_{ij}^2}}$$

In other words, normalization parameters are computed separately for each pixel location by computing mean and standard deviation down the channels. This improves convergence, and the normalization for each pixel is independent, thus output for different blocks of the input image can be tiled together without displaying noticeable boundaries because there are no spatial components to the normalization.

Turning back to FIG. 5A, an exemplary generator 504 comprises a plurality of convolution layers. For each convolution layer (except for the final layers), the sequence of steps includes: Convolution→Normalization down channels→rectified linear unit (ReLU) activation function. The exemplary generator 502 can be implemented similarly.

For each convolution layer, FIG. 5A lists the spatial size of the filter (e.g. 3×3), followed by the stride (e.g. s2 represents a stride of 2 in x and y dimensions, s0.5 represents a fractional stride for upscaling convolutions), followed by the number of output channels (equivalently, number of filters), e.g. c128 is 128 output channels.

The final convolution layer of each generator uses a tanh activation function, with no normalization. The output for this should be similar to an image, so tanh which is bounded on both sides keeps things within a reasonable range, and the tanh values are rescaled to get values on [0,255] for the final output image.

In some embodiments, skip connections are added between same spatial resolution convolution layers on both sides of the residual blocks in each generator. The skip connections can improve retention of detail in the output images. With reference to FIGS. 5A and 5B, each generator includes four (4) skip connections labelled a, b, c, and d.

Specifically, with the overall structure of each generator involves processing the image with lower and lower spatial resolution across layers of the generator to obtain a more abstract representation and thus more information on the image content, and then extending back out spatially to get the same sized outputs. However, in this process, details in the image data can be lost, and it can be difficult to reconstruct a detailed output from the process.

In the exemplary embodiment, because resolution is decreased and increased by factors of a fixed value (e.g., 2), each layer on the input side has a corresponding layer on the output side associated with the same resolution. Thus, in addition to passing the input data straight forward through the network, skip connections can be added such that for each pair of layers associated with matching spatial resolution, intermediate data can be fed from the input side directly to the output side for further processing. In other words, there is a path where the system does not completely discard all of the original image information and thus can still use that to get a more detailed output.

Figure 5C:
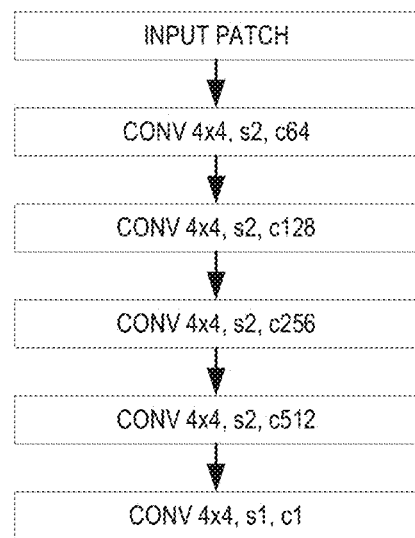
FIG. 5C depicts an exemplary discriminator of a modified CycleGAN implementation, in accordance with some embodiments.

FIG. 5C illustrates an exemplary discriminator 480, which can correspond to either of discriminators 212 or 214 of FIG. 4A. In the depicted example, the architectures of the discriminators 212 and 214 are identical. The sequence for non-final convolutions can be: Convolution→instance norm (original version)→leakly relu (slope=0.2). For the final convolution layer in the discriminator, there is no normalization or activation function.

FIG. 7 illustrates process 700 for, according to various examples. Process 700 is performed, for example, using one or more electronic devices implementing a software platform. In some examples, process 700 is performed using a client-server system, and the blocks of process 700 are divided up in any manner between the server and a client device. In other examples, the blocks of process 700 are divided up between the server and multiple client devices. Thus, while portions of process 700 are described herein as being performed by particular devices of a client-server system, it will be appreciated that process 700 is not so limited. In other examples, process 700 is performed using only a client device (e.g., user device 100) or only multiple client devices. In process 700, some blocks are, optionally, combined, the order of some blocks is, optionally, changed, and some blocks are, optionally, omitted. In some examples, additional steps may be performed in combination with the process 700. Accordingly, the operations as illustrated (and described in greater detail below) are exemplary by nature and, as such, should not be viewed as limiting.

At block 702, an exemplary device or system receives an input image patch, wherein the input image patch is of a second data domain. At block 704, the device provides the input image patch to a preprocessing algorithm to obtain a preprocessed image patch, wherein the preprocessing algorithm is trained to transform data of the second data domain to data of a first data domain. At block 706, the device provides the preprocessed image patch to a pre-trained classification algorithm, wherein the pre-trained classification algorithm is trained based on training data of the first data domain. At block 708, the device obtains one or more classification outputs from the pre-trained classification algorithm based on the preprocessed image patch.

In some embodiments, data of the first data domain is associated with a first image style, data of the second data domain is associated with a second image style, and the preprocessing algorithm is trained to transform a first image of the first image style to a second image of the second image style while preserving content of the first image in the second image.

In some embodiments, data of the first data domain is associated with a first image resolution range, and data of the second data domain is associated with a second image resolution range.

In some embodiments, the method further comprises training the preprocessing algorithm, wherein training the preprocessing algorithm comprises: receiving a first set of training data of the first data domain; receiving a second set of training data of the second data domain; training a first image generator, based on the first set of training data and the second set of training data, to transform a given image of the first data domain to an image of the second data domain; training a second image generator, based on the first set of training data and the second set of training data, to transform a given image of the second data domain to an image of the first data domain, wherein the preprocessing algorithm comprises the second image generator.

In some embodiments, the first image generator comprises a first convolution neural network, and the second image generator comprises a second convolution neural network.

In some embodiments, the method further comprises optimizing the second image generator by performing normalization across a plurality of channels in the second convolution neural network, wherein the plurality of channels represent outputs of a convolution layer, and wherein the plurality of channels correspond to a single pixel.

In some embodiments, the method further comprises providing an original image patch of the second set of training data to the second image generator to obtain a corresponding processed image patch; and calculating an adversarial loss based on the original image patch and the corresponding processed image patch.

In some embodiments, the method further comprises providing the corresponding processed image patch to the first image generator to obtain a corresponding cycled image patch; and calculating a cycle loss based on the original image patch and the corresponding cycled image patch.

In some embodiments, the original image patch is a portion of an image in the first second set of training data, wherein the portion is selected based on one or more annotations associated with the image.

In some embodiments, the one or more annotations represent one or more objects of interest.

In some embodiments, the first image generator is configured to receive an input image of a first size and output an output image of a second size, wherein the second size is smaller than the first size.

In some embodiments, the second image generator is configured to receive an input image of the second size and output an output image of the first size.

In some embodiments, the second convolution neural network comprises a skip connection associated with two layers of the neural network, wherein the two layers are associated with a same spatial resolution.

In some embodiments, training the second image generator comprises calculating an identity mapping value.

In some embodiments, the first image generator and the second image generator are part of a modified CycleGAN implementation.

In some embodiments, data of the second data domain is captured by one or more unmanned aircraft vehicles.

In some embodiments, data of the first data domain is associated with the ImageNet database.

In some embodiments, the input image patch is a first input image patch, wherein the preprocessed image patch is a first preprocessed image patch, and wherein the preprocessing algorithm is a first preprocessing algorithm, further comprising: receiving a second input image patch, wherein the second input image patch is of a third data domain; providing the second input image patch to a second preprocessing algorithm to obtain a second preprocessed image patch, wherein the second preprocessing algorithm is trained to transform data of the third data domain to data of the first data domain; providing the second preprocessed image patch to the pre-trained classification algorithm; and obtaining one or more classification outputs from the pre-trained classification algorithm based on the second preprocessed image patch.

An exemplary electronic device comprises: one or more processors; a memory; and one or more programs, wherein the one or more programs are stored in the memory and configured to be executed by the one or more processors, the one or more programs including instructions for: receiving a input image patch, wherein the input image patch is of a second data domain; providing the input image patch to a preprocessing algorithm to obtain a preprocessed image patch, wherein the preprocessing algorithm is trained to transform data of the second data domain to data of a first data domain; providing the preprocessed image patch to a pre-trained classification algorithm, wherein the pre-trained classification algorithm is trained based on training data of the first data domain; obtaining one or more classification outputs from the pre-trained classification algorithm based on the preprocessed image patch.

In some embodiments, a non-transitory computer-readable storage medium stores one or more programs, the one or more programs comprising instructions, which when executed by one or more processors of an electronic device having a display, cause the electronic device to: receive a input image patch, wherein the input image patch is of a second data domain; provide the input image patch to a preprocessing algorithm to obtain a preprocessed image patch, wherein the preprocessing algorithm is trained to transform data of the second data domain to data of a first data domain; provide the preprocessed image patch to a pre-trained classification algorithm, wherein the pre-trained classification algorithm is trained based on training data of the first data domain; obtain one or more classification outputs from the pre-trained classification algorithm based on the preprocessed image patch.

An exemplary computer-enabled method for pre-processing image data to improve performance of classification algorithms comprises: receiving data representing an input image, wherein the data representing the input image is of a second data domain; receiving data representing a pre-trained image classification algorithm, wherein the pre-trained image classification algorithm was trained based on a first data domain; generating, based on the data representing the input image and the preprocessing algorithm, preprocessed image data, wherein the preprocessing algorithm is configured to transform data of the second data domain to data of a first data domain.

In some embodiments, the method further comprises, before generating the preprocessed image data, training the preprocessing algorithm based on a first set of training data of the first data domain and a second set of training data of the second data domain.

In some embodiments, training the preprocessing algorithm comprises: training a first image generator, based on the first set of training data and the second set of training data, to transform a given image of the first data domain to an image of the second data domain; and training a second image generator, based on the first set of training data and the second set of training data, to transform a given image of the second data domain to an image of the first data domain.

In some embodiments, the generating the preprocessed image data is performed in response to receiving the data representing the input image and the data representing the pre-trained image classification algorithm.

In some embodiments, the data representing the pre-trained image classification algorithm comprises an indication comprises an indication that the pre-trained image classification algorithm was trained based on a first data domain.

An exemplary electronic device comprises one or more processors; a memory; and one or more programs, wherein the one or more programs are stored in the memory and configured to be executed by the one or more processors, the one or more programs including instructions for: receiving data representing an input image, wherein the data representing the input image is of a second data domain; receiving data representing a pre-trained image classification algorithm, wherein the pre-trained image classification algorithm was trained based on a first data domain; generating, based on the data representing the input image and the preprocessing algorithm, preprocessed image data, wherein the preprocessing algorithm is configured to transform data of the second data domain to data of a first data domain.

An exemplary non-transitory computer-readable storage medium stores one or more programs, the one or more programs comprising instructions, which when executed by one or more processors of an electronic device having a display, cause the electronic device to: receive data representing an input image, wherein the data representing the input image is of a second data domain; receive data representing a pre-trained image classification algorithm, wherein the pre-trained image classification algorithm was trained based on a first data domain; generate, based on the data representing the input image and the preprocessing algorithm, preprocessed image data, wherein the preprocessing algorithm is configured to transform data of the second data domain to data of a first data domain.

The operations described above, including those described with reference to FIGS. 1-7, are optionally implemented by components depicted in FIG. 8. It would be clear to a person having ordinary skill in the art how other processes, for example, combinations or sub-combinations of all or part of the operations described above, may be implemented based on the components depicted in FIG. 8. It would also be clear to a person having ordinary skill in the art how the methods, techniques, systems, and devices described herein may be combined with one another, in whole or in part, whether or not those methods, techniques, systems, and/or devices are implemented by and/or provided by the components depicted in FIG. 8.

Figure 8:
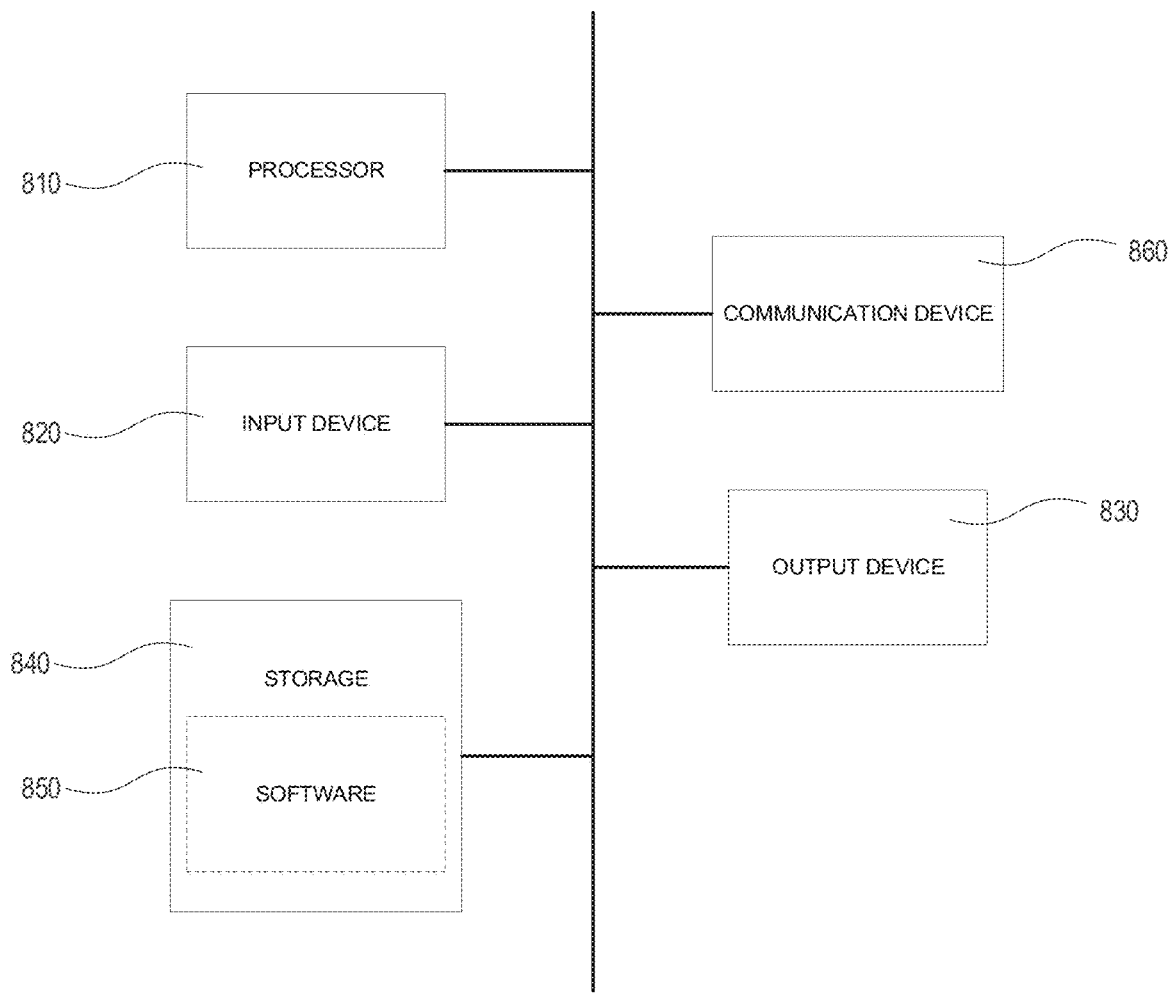
FIG. 8 depicts an exemplary electronic device, in accordance with some embodiments.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, workstation, server or handheld computing device (portable electronic device) such as a phone or tablet. The device can include, for example, one or more of processor 810, input device 820, output device 830, storage 840, and communication device 860. Input device 820 and output device 830 can generally correspond to those described above, and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. A computer-enabled method for analyzing image data, the method comprising:
   receiving an input image, wherein the input image is of a second data domain;
   providing the input image to a preprocessing algorithm to obtain a transformed image, wherein the preprocessing algorithm is trained to transform data of the second data domain to data of a first data domain;

providing the transformed image to a trained algorithm to analyze the transformed image, wherein the trained algorithm is trained based on training data of the first data domain.

2. The method of claim 1,
wherein data of the first data domain is associated with a first image style,
wherein data of the second data domain is associated with a second image style, and
wherein the preprocessing algorithm is trained to transform a first image of the first image style to a second image of the second image style while preserving content of the first image in the second image.

3. The method of claim 1,
wherein data of the first data domain is associated with a first image resolution range, and
wherein data of the second data domain is associated with a second image resolution range.

4. The method of claim 1, further comprising training the preprocessing algorithm, wherein training the preprocessing algorithm comprises:
receiving a first set of training data of the first data domain;
receiving a second set of training data of the second data domain;
training a first image generator, based on the first set of training data and the second set of training data, to transform a given image of the first data domain to an image of the second data domain; and
training a second image generator, based on the first set of training data and the second set of training data, to transform a given image of the second data domain to an image of the first data domain, wherein the preprocessing algorithm comprises the second image generator.

5. The method of claim 4, wherein the first image generator comprises a first convolution neural network, and the second image generator comprises a second convolution neural network.

6. The method of claim 5, further comprising optimizing the second image generator by performing normalization across a plurality of channels in the second convolution neural network,
wherein the plurality of channels represent outputs of a convolution layer, and
wherein the plurality of channels correspond to a single pixel.

7. The method of claim 4, further comprising:
providing an original image of the second set of training data to the second image generator to obtain a corresponding processed image; and
calculating an adversarial loss based on the original image and the corresponding processed image.

8. The method of claim 7, further comprising:
providing the corresponding processed image to the first image generator to obtain a corresponding cycled image; and
calculating a cycle loss based on the original image and the corresponding cycled image.

9. The method of claim 7, wherein the original image is a portion of an image in the second set of training data, wherein the portion is selected based on one or more annotations associated with the image in the second set of training data.

10. The method of claim 9, wherein the one or more annotations represent one or more objects of interest.

11. The method of claim 4, wherein the first image generator is configured to receive an input image of a first size and output an output image of a second size, wherein the second size is smaller than the first size.

12. The method of claim 4, wherein the second image generator is configured to receive an input image of the second size and output an output image of the first size.

13. The method of claim 4, wherein the second convolution neural network comprises a skip connection associated with two layers of the neural network, wherein the two layers are associated with a same spatial resolution.

14. The method of claim 4, wherein training the second image generator comprises calculating an identity mapping value.

15. The method of claim 4, wherein the first image generator and the second image generator are part of a modified CycleGAN implementation.

16. The method of claim 1, wherein data of the second data domain is captured by one or more unmanned aircraft vehicles.

17. The method of claim 1, wherein data of the first data domain is associated with the ImageNet database.

18. The method of claim 1, wherein the input image is a first input image, wherein the transformed image is a first transformed image, and wherein the preprocessing algorithm is a first preprocessing algorithm, further comprising:
receiving a second input image, wherein the second input image is of a third data domain;
providing the second input image to a second preprocessing algorithm to obtain a second transformed image, wherein the second preprocessing algorithm is trained to transform data of the third data domain to data of the first data domain;
providing the second transformed image to the trained algorithm to analyze the second transformed image.

19. An electronic device, comprising:
one or more processors;
a memory; and
one or more programs, wherein the one or more programs are stored in the memory and configured to be executed by the one or more processors, the one or more programs including instructions for:
receiving an input image, wherein the input image is of a second data domain;
providing the input image to a preprocessing algorithm to obtain a transformed image, wherein the preprocessing algorithm is trained to transform data of the second data domain to data of a first data domain;
providing the transformed image to a trained algorithm to analyze the transformed image, wherein the trained algorithm is trained based on training data of the first data domain.

20. A non-transitory computer-readable storage medium storing one or more programs, the one or more programs comprising instructions, which when executed by one or more processors of an electronic device having a display, cause the electronic device to:
receive an input image, wherein the input image is of a second data domain;
provide the input image to a preprocessing algorithm to obtain a transformed image, wherein the preprocessing algorithm is trained to transform data of the second data domain to data of a first data domain;
provide the transformed image to a trained algorithm to analyze the transformed image, wherein the trained algorithm is trained based on training data of the first data domain.

* * * * *